US011383692B2

(12) United States Patent
Son et al.

(10) Patent No.: US 11,383,692 B2
(45) Date of Patent: Jul. 12, 2022

(54) APPARATUS AND METHOD FOR CONTROLLING ENGINE START DURING REFUELING OF HYBRID VEHICLE

(71) Applicants: HYUNDAI MOTOR COMPANY, Seoul (KR); KIA MOTORS CORPORATION, Seoul (KR)

(72) Inventors: Hui-Un Son, Seoul (KR); Seok-Min Jeong, Suwon-Si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 84 days.

(21) Appl. No.: 16/151,965

(22) Filed: Oct. 4, 2018

(65) Prior Publication Data
US 2019/0193713 A1    Jun. 27, 2019

(30) Foreign Application Priority Data
Dec. 27, 2017  (KR) .................... 10-2017-0181252

(51) Int. Cl.
*B60W 20/00*    (2016.01)
*F02N 11/10*    (2006.01)
(Continued)

(52) U.S. Cl.
CPC ............. *B60W 20/00* (2013.01); *B60K 6/48* (2013.01); *F02N 11/0803* (2013.01); *F02N 11/101* (2013.01); *B60K 15/03* (2013.01); *B60K 2015/0319* (2013.01); *B60K 2015/03375* (2013.01); *B60K 2015/03381* (2013.01);
(Continued)

(58) Field of Classification Search
CPC ............. B60W 20/00; B60W 2520/04; B60W 2520/10; B60W 2510/0614; B60W 2540/12; B60W 2540/10; F02N 11/101; F02N 11/0803; F02N 11/0833; F02N 11/0822; F02N 2200/0801; F02N 2200/102; F02N 2200/101; F02N 2200/08; B60K 6/48; B60K 2015/03375; B60K 2015/0319; B60K 2015/03381; B60K 2015/03394;
(Continued)

(56) References Cited

U.S. PATENT DOCUMENTS

2006/0287804 A1* 12/2006 Takayanagi .......... F02M 25/089
701/112
2017/0002760 A1* 1/2017 Hayashita ............. F02D 41/065

FOREIGN PATENT DOCUMENTS

JP    2001-342868 A    12/2001
JP    2003-065101 A    3/2003
(Continued)

*Primary Examiner* — Alan D Hutchinson
(74) *Attorney, Agent, or Firm* — Morgan, Lewis & Bockius LLP

(57) ABSTRACT

An apparatus for controlling an engine start during refueling of a hybrid vehicle includes a controller configured to: stop an engine to block the engine start by sensing whether the vehicle enters into a refueling state in accordance with a fuel injection port open or closed state, a vehicle speed, and brake pedal state (BPS) information, and start the engine to release blocking of the engine start in accordance with a switchover to a hybrid electric vehicle (HEV) mode by sensing whether the refueling state has been released in accordance with the fuel injection port open or closed state, the vehicle speed, and acceleration pedal state APS) information.

8 Claims, 3 Drawing Sheets

(51) Int. Cl.
*B60K 6/48* (2007.10)
*F02N 11/08* (2006.01)
*B60K 15/03* (2006.01)

(52) U.S. Cl.
CPC .............. *B60K 2015/03394* (2013.01); *B60W 2510/0614* (2013.01); *B60W 2520/04* (2013.01); *B60W 2520/10* (2013.01); *B60W 2540/10* (2013.01); *B60W 2540/12* (2013.01); *B60Y 2200/92* (2013.01); *B60Y 2300/192* (2013.01); *F02N 2200/0801* (2013.01); *F02N 2200/101* (2013.01); *F02N 2200/102* (2013.01)

(58) Field of Classification Search
CPC ................ B60K 15/03; B60Y 2200/92; B60Y 2300/192; Y02T 10/40
See application file for complete search history.

(56) References Cited

FOREIGN PATENT DOCUMENTS

| | | | |
|---|---|---|---|
| JP | 2003065101 | * | 3/2003 |
| JP | 2006-347377 | A | 12/2006 |
| JP | 2006-347378 | A | 12/2006 |
| KR | 20-0301860 | Y1 | 1/2003 |
| KR | 10-0501581 | B1 | 7/2005 |
| KR | 10-0777203 | B1 | 11/2007 |
| KR | 10-0853675 | B1 | 8/2008 |

\* cited by examiner

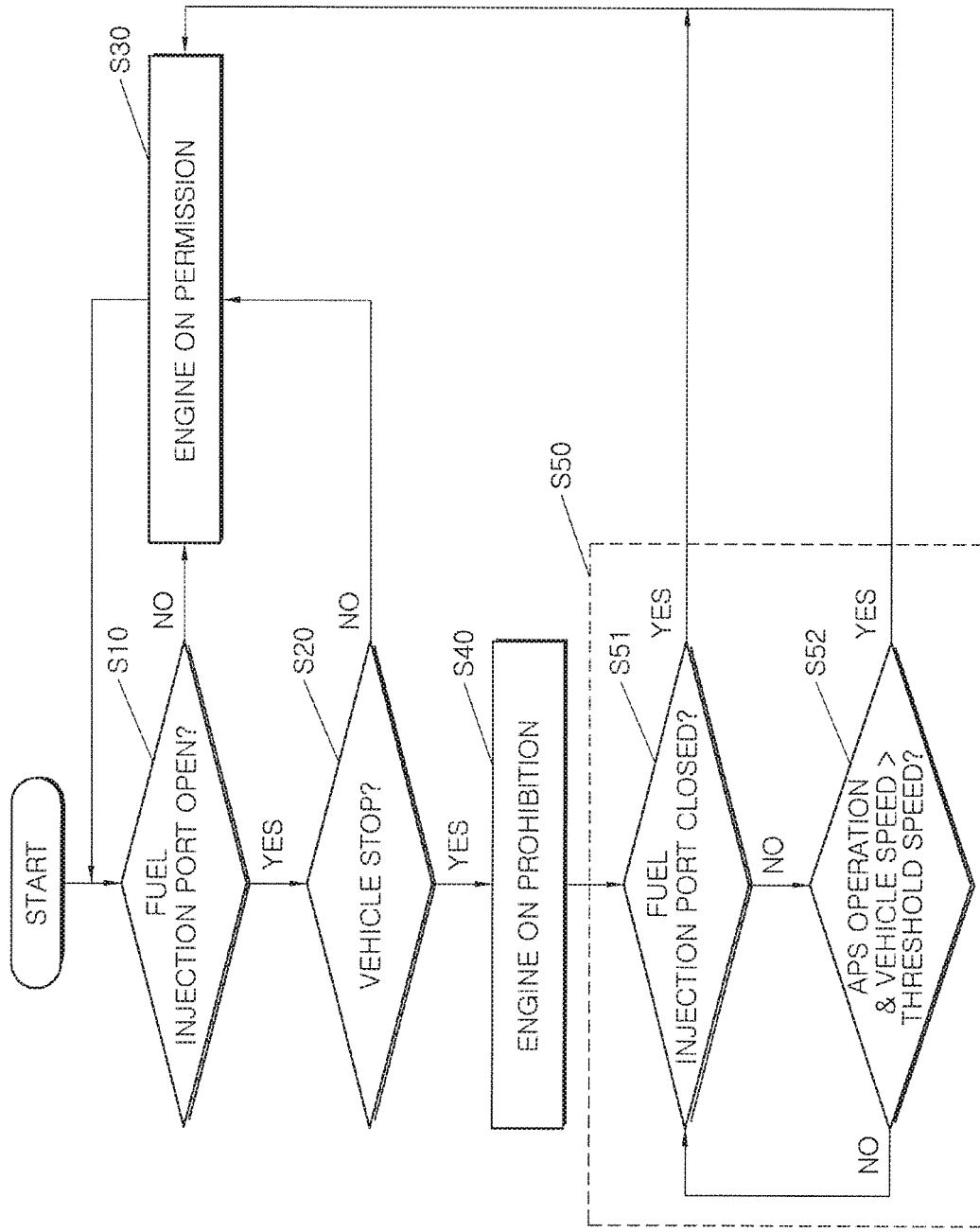

APPARATUS AND METHOD FOR CONTROLLING ENGINE START DURING REFUELING OF HYBRID VEHICLE

CROSS-REFERENCE TO RELATED APPLICATIONS

This application claims priority to Korean Patent Application No. 10-2017-0181252, filed on Dec. 27, 2017, which is incorporated herein by reference in its entirety.

TECHNICAL FIELD

The present disclosure relates to an apparatus and a method for controlling an engine start during refueling of a hybrid vehicle, and particularly, to a control apparatus and a control method for blocking an engine start or releasing the blocking of the engine start in accordance with a vehicle speed and a fuel injection port open or closed state during refueling of a hybrid vehicle.

BACKGROUND

In order to prevent danger of fire and explosion caused by spark during refueling and to reduce damage due to fuel mixing accidents, it is required to stop an engine during refueling.

In the related art related to an engine stop during refueling, if a fuel injection port is open, an open state of the fuel injection port is displayed on a cluster for warning with warning sound, or an engine start itself is blocked.

However, such warning of the open state of the fuel injection port by means of the warning sound or the like is not an active control of a vehicle, and if a driver pays no attention to or cannot recognize the warning, no function can be performed. Further, the blocking of the engine start causes a problem that vehicle driving itself is blocked even in the case of the damage of the fuel injection port of circuit defect.

Particularly, in the related art, it is not possible to consider the characteristics of a hybrid vehicle driven in an electric vehicle (EV) mode and in a hybrid electric vehicle (HEV) mode at all.

SUMMARY

Exemplary embodiments of the present disclosure overcome the above disadvantages and other disadvantages not described above, and provide an apparatus and a method for controlling an engine start during refueling of a hybrid vehicle, which can realize a driver's driving intention by determining that the vehicle is not in a refueling state if the vehicle is driven in an electric vehicle (EV) mode by a driver's intention to cause a vehicle speed to exceed a threshold speed although a fuel injection port is recognized to be open and by permitting the vehicle mode to be switched to a hybrid electric vehicle (HEV) mode.

Other objects and advantages of the present disclosure can be understood by the following description, and become apparent with reference to the embodiments of the present disclosure. Further, it is obvious to those skilled in the art to which the present disclosure pertains that the objects and advantages of the present disclosure can be realized by the means as claimed and combinations thereof.

In accordance with an embodiment of the present disclosure, an apparatus for controlling an engine start during refueling of a hybrid vehicle includes a controller configured to: stop an engine to block the engine start by sensing whether the vehicle enters into a refueling state in accordance with a fuel injection port open or closed state, a vehicle speed, and brake pedal state (BPS) information input to an electronic control unit (ECU) or a hybrid control unit (HCU); and to start the engine to release blocking of the engine start in accordance with a switchover to a HEV mode by sensing whether the refueling state has been released in accordance with the fuel injection port open or closed state, the vehicle speed, and acceleration pedal state (APS) information.

The refueling state entrance sensor may sense the refueling state if the fuel injection port is open and the vehicle speed is 0.

The controller may include a refueling state entrance sensor stopping the engine previously and blocking the engine start in consideration of a deceleration if the vehicle is decelerated during driving in a state where the fuel injection port is open.

The controller includes a refueling state release sensor sensing the release of the refueling state if the fuel injection port is closed and the vehicle speed is higher than 0.

The refueling state release sensor may sense that the refueling state has been released if a driver drives the vehicle in an EV mode by operating an acceleration pedal with an acceleration intention even in case where the fuel injection port is open and the vehicle speed exceeds a threshold speed.

The refueling state release sensor may sense that the refueling state has not been released if the acceleration is not caused by the driver's operation of the acceleration pedal even in case where the vehicle speed exceeds the threshold speed.

In accordance with another embodiment of the present disclosure, a method for controlling an engine start during refueling of a hybrid vehicle includes: determining, by a controller, opening of a fuel injection port; determining, by the controller, a vehicle stop; permitting, by the controller, an engine start; blocking, by the controller, the engine start; and determining a release of a refueling state.

The determining the opening of the fuel injection port may determine whether the fuel injection port is open by a refueling state entrance sensor in accordance with information on a fuel injection port open or closed state input to the controller.

If the determining the opening of the fuel injection port determines that the fuel injection port is closed, the refueling state entrance sensor may permit the engine start by performing the engine start permission without sensing the refueling state.

If the determining the opening of the fuel injection port determines that the fuel injection port is open, the vehicle stop determination may be performed.

The determining the vehicle stop may determine whether a vehicle speed is 0 by means of the refueling state entrance sensor in accordance with vehicle speed information input to the controller.

If the determining the vehicle stop determines that the vehicle speed is 0 and the vehicle is stopped, the refueling state entrance sensor may sense the refueling state and block the engine start by performing the engine start blocking.

If the determining the vehicle stop determines that the vehicle speed is not 0 and the vehicle is not stopped, the engine start permission is performed to permit the engine start.

The determining the release of the refueling state may be performed to sense the release of the refueling state by means of a refueling state release sensor after the engine start blocking is performed.

The determining the release of the refueling state may include determining closing of the fuel injection port, and determining an EV mode driving.

The determining the closing of the fuel injection port may determine whether the fuel injection port is closed by means of the refueling state release sensor in accordance with fuel injection port open or closed state information input to the controller.

If the determining the closing of the fuel injection port determines that the fuel injection port is closed, the refueling state release sensor may sense the release of the refueling state and permit the engine start by performing the engine start permission.

If the determining the closing of the fuel injection port determines that the fuel injection port is open, the EV mode driving determination may be performed.

The determining the EV mode driving may determine whether the vehicle speed exceeds a threshold speed by means of the refueling state release sensor through the EV mode driving as a driver operates an acceleration pedal in accordance with APS and vehicle speed information input to the controller.

If the determining the EV mode driving determines the EV mode driving, the refueling state release sensor may sense the release of the refueling state and permit the engine start by performing the engine start permission.

If the determining the EV mode driving determines that the vehicle is not in the EV mode driving state, the refueling state release sensor may determine the fuel injection port open or closed state through returning to the determining of the closing of the fuel injection port while the engine start blocking is continuously maintained through the blocking of the engine start.

According to the apparatus and method for controlling the engine start during refueling of the hybrid vehicle, the engine is automatically stopped during refueling, and thus inconvenience caused by stopping of the vehicle for every refueling can be prevented. Accordingly, driver's convenience can be improved, and fire accidents can be prevented.

Further, even if the fuel injection port is recognized to be in an open state due to driver's mistake, damage of the fuel injection port, or circuit defect, it is possible to drive the vehicle in accordance with the driver's driving intention, and thus the blocking of the vehicle driving can be prevented from occurring.

Further, the HEV mode is permitted only in case where the vehicle is accelerated by the driver's driving intention through the acceleration pedal operation, and if the vehicle speed exceeds the threshold speed due to collision with a rear-side vehicle, creep torque, or inclination, the engine start is blocked to prevent accident occurrence.

It is to be understood that both the foregoing general description and the following detailed description of the present disclosure are exemplary and explanatory and are intended to provide further explanation of the disclosure as claimed.

BRIEF DESCRIPTION OF THE DRAWINGS above and other objects, features and other advantages of the present disclosure will be more clearly understood from the following detailed description taken in conjunction with the accompanying drawings, in which:

FIG. 3 is a flowchart illustrating a method for controlling an engine start during refueling of a hybrid vehicle according to the present disclosure.

DESCRIPTION OF SPECIFIC EMBODIMENTS

Hereinafter, an apparatus and a method for controlling an engine start during refueling of a hybrid vehicle according to the present disclosure will be described in detail with reference to the accompanying drawings. However, related well-known functions and configurations are not described in detail since they would obscure the subject matter of the disclosure in unnecessary detail.

Figure 1:
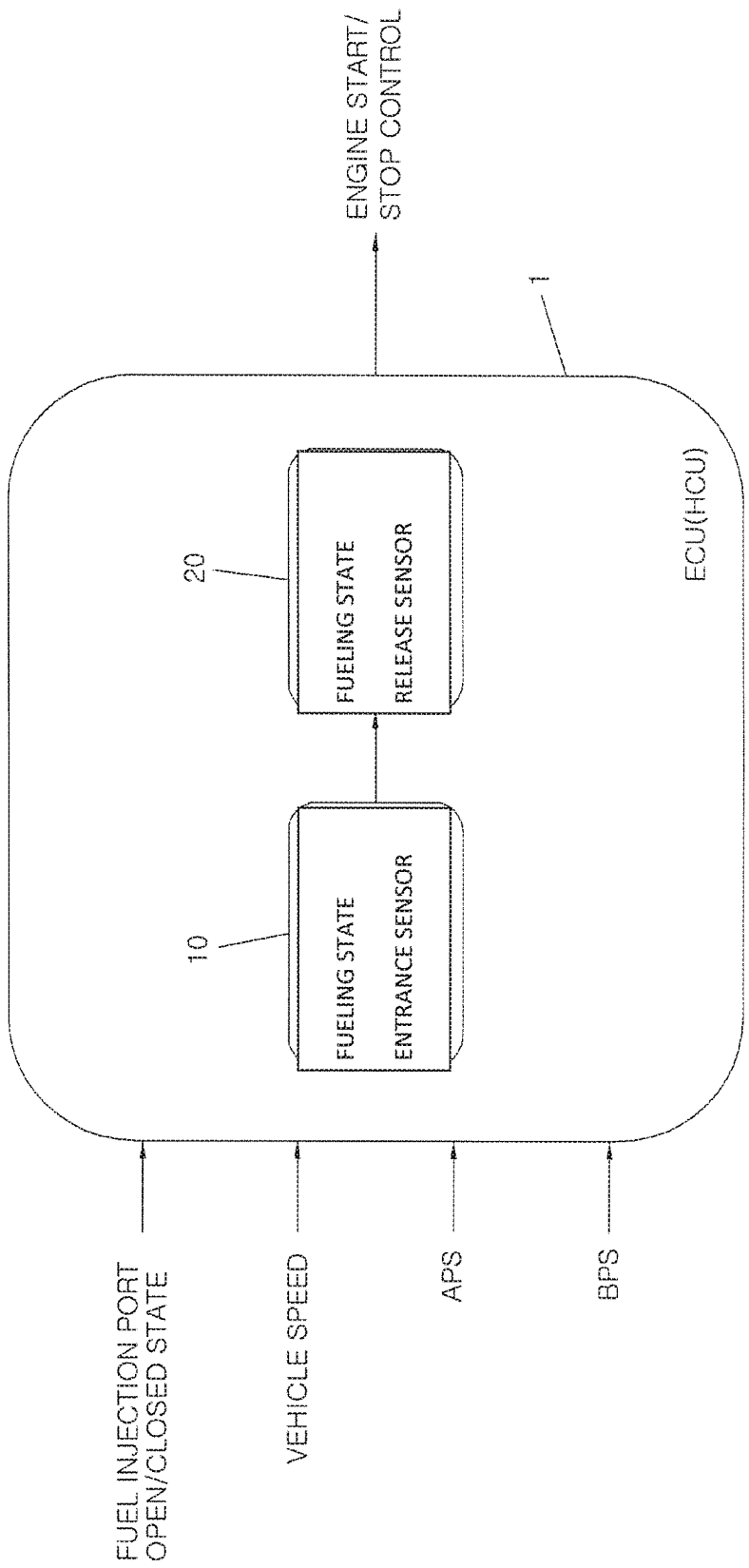
FIG. 1 is a diagram illustrating the configuration of an apparatus for controlling an engine start during refueling of a hybrid vehicle according to the present disclosure.

FIG. 1 is a diagram illustrating the configuration of an apparatus for controlling an engine start during refueling of a hybrid vehicle according to the present disclosure.

Referring to FIG. 1, an apparatus for controlling an engine start during refueling of a hybrid vehicle according to the present disclosure includes a refueling state entrance sensor 10 and a refueling state release sensor 20 implemented in an electronic control unit (ECU) or a hybrid control unit (HCU) 1.

The refueling state entrance sensor 10 and the refueling state release sensor 20 sense refueling state entrance and release in accordance with a fuel injection port open or closed state, a vehicle speed, acceleration pedal state (APS) and brake pedal state (BPS) information input to the ECU or the HCU 1, and control engine start and stop.

In the various embodiments disclosed herein, the ECU or HCU 1 may be an embedded system that can control one or more of electrical systems or subsystems in a vehicle.

The refueling state entrance sensor 10 is configured to sense whether the vehicle has entered into the refueling state in accordance with the fuel injection port open or closed state, the vehicle speed, and the BPS information. If the fuel injection port is open and the vehicle speed is 0, the refueling state entrance sensor 10 senses the refueling state, and controls to stop the engine and to block the engine start.

In this case, even if the vehicle is completely stopped in a state where the fuel injection port is closed, the refueling state entrance sensor 10 does not sense the refueling state. If the fuel injection port is open, the refueling state entrance sensor 10 senses the refueling state for the first time, stops the engine, and blocks the engine start.

Further, the refueling state entrance sensor 10 may stop the engine previously and block the engine start in consideration of a deceleration if the vehicle is decelerated during the vehicle driving in a state where the fuel injection port is open. For example, in case where the deceleration is −1 m/s$^2$, and a predetermined engine stop time is 2 seconds, the refueling state entrance sensor 10 determines the refueling state and stops the engine to block the engine start in response to the vehicle deceleration that makes the vehicle speed reach 2 m/s.

The refueling state release sensor 20 is configured to sense whether the refueling state has been released in accordance with the fuel injection port open or closed state, the vehicle speed, and the APS information. If the fuel injection port is closed and the vehicle speed is higher than 0, the refueling state release sensor 20 senses the release of the refueling state, releases the engine start blocking, and controls the engine so as to start the engine in accordance with switchover to the HEV mode.

In this case, the refueling state release sensor 20 senses that the refueling state has been released if the driver drives the vehicle in the EV mode by operating the acceleration pedal with the acceleration intention even in case where the fuel injection port is open and the vehicle speed exceeds the threshold speed.

The threshold speed is predetermined as the maximum speed capable of being implemented by creep torque on the level ground. For example, if the maximum speed of the creep torque is 10 kph on the even ground, the threshold speed is set to 10 kph.

Further, if the acceleration is not caused by the driver's operation of the acceleration pedal, the refueling state release sensor 20 does not release the refueling state. For example, even if the vehicle speed exceeds the threshold speed due to collision with the rear-side vehicle or due to the creep torque caused by release of a parking brake during driver's absence or an inclined surface, the refueling state release sensor 20 does not release the refueling state, but maintains the blocking of the engine start.

On the other hand, the apparatus for controlling the engine start during refueling of the hybrid vehicle according to the present disclosure may operate together with a fuel injection port opening warning system in the related art.

Figure 2:
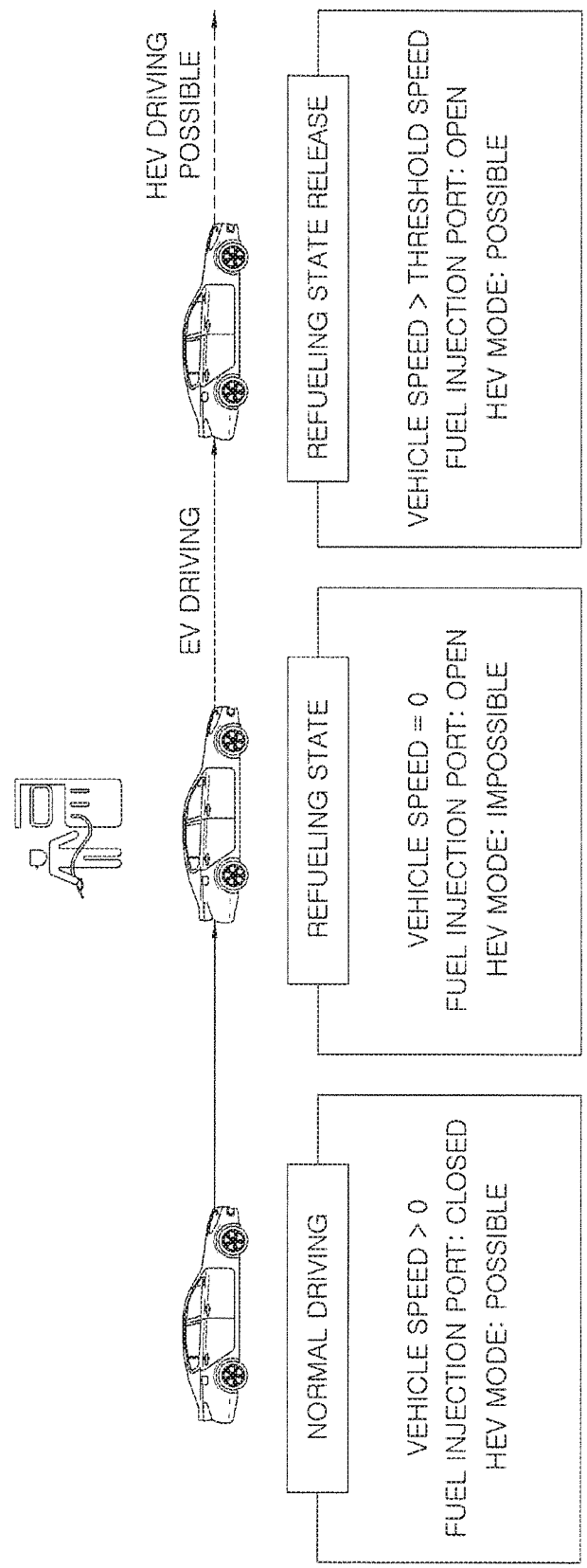
FIG. 2 is a diagram explaining the operation of an apparatus according to the present disclosure in accordance with hybrid vehicle driving, refueling, and driving after refueling.

FIG. 2 is a diagram explaining the operation of an apparatus according to the present disclosure in accordance with hybrid vehicle driving, refueling, and driving after refueling.

Referring to FIG. 2, if the vehicle is in a normal driving state, the vehicle speed is higher than 0, and the fuel injection port is in a closed state. In this case, the refueling state entrance sensor 10 does not sense the refueling state, and thus the vehicle can be normally driven in the HEV mode.

If the vehicle is in the refueling state, the vehicle speed is 0, and the fuel injection port is in an open state. In this case, the refueling state entrance sensor 10 senses the refueling state, and thus the vehicle is unable to be driven in the HEV mode.

In case where the vehicle is driven in the EV mode after refueling, if the vehicle is accelerated by the driver's operation of the acceleration pedal and the vehicle speed becomes higher than the threshold speed although the fuel injection port open or closed state information indicates an open state due to the driver's mistake, damage of the fuel injection port, or circuit defect, the refueling state release sensor 20 senses the refueling state release, and permits the switchover to the HEV mode. Accordingly, the vehicle can be driven again in the HEV mode.

FIG. 3 is a flowchart illustrating a method for controlling engine start during refueling of a hybrid vehicle according to the present disclosure.

Referring to FIG. 3, a method for controlling an engine start during refueling of a hybrid vehicle according to the present disclosure is configured to include determining opening of a fuel injection port (S10), determining a vehicle stop (S20), permitting an engine start (S30), blocking the engine start (S40), and determining a release of a refueling state (S50).

The determining the opening of the fuel injection port (S10) determines whether the fuel injection port is open by the refueling state entrance sensor 10 in accordance with information on the fuel injection port open or closed state input to the ECU or the HCU.

If the determining the opening of the fuel injection port (S10) determines that the fuel injection port is closed, the refueling state entrance sensor 10 permits the engine start by performing the engine start permission without sensing the refueling state.

In contrast, if the determining the opening of the fuel injection port (S10) determines that the fuel injection port is open, the vehicle stop determination (S20) is performed.

The determining the vehicle stop (S20) determines whether the vehicle speed is 0 by means of the refueling state entrance sensor 10 in accordance with the vehicle speed information input to the ECU or the HCU 1.

If the determining the vehicle stop (S20) determines that the vehicle speed is 0 and the vehicle is stopped, the refueling state entrance sensor 10 senses the refueling state and blocks the engine start by performing the engine start blocking (S40).

In contrast, if the determining the vehicle stop (S20) determines that the vehicle is not stopped, the engine start permission (S30) is performed to permit the engine start.

The determining the release of the refueling state may be performed to sense the release of the refueling state (S50), which includes determining closing of the fuel injection port (S51) and determining an EV mode driving (S52), by means of the refueling state release sensor 20 after the engine start blocking (S40) is performed.

The determining the closing of the fuel injection port (S51) determines whether the fuel injection port is closed by means of the refueling state release sensor 20 in accordance with the fuel injection port open or closed state information input to the ECU or the HCU 1.

If the determining the closing of the fuel injection port (S51) determines that the fuel injection port is closed, the refueling state release sensor 20 senses the release of the refueling state and permits the engine start by performing the engine start permission (S30).

In contrast, if the determining the closing of the fuel injection port (S51) determines that the fuel injection port is open, the EV mode driving determination (S52) is performed.

The determining the EV mode driving (S52) determines whether the vehicle speed exceeds the threshold speed by means of the refueling state release sensor 20 through the EV mode driving as the driver operates the acceleration pedal in accordance with the APS and vehicle speed information input to the ECU or the HCU 1.

If the determining the EV mode driving (S52) determines the EV mode driving, the refueling state release sensor 20 senses the release of the refueling state and permits the engine start by performing the engine start permission (S30).

In contrast, if the determining the EV mode driving (S52) determines that the vehicle is not in the EV mode driving state, the refueling state release sensor 20 determines the fuel injection port open or closed state through returning to the determining of the closing of the fuel injection port (S51) while the engine start blocking is continuously maintained through the blocking of the engine start (S40).

According to the apparatus and method for controlling the engine start during refueling of the hybrid vehicle according to the present disclosure as described above, the engine is automatically stopped during refueling, and thus, inconvenience caused by stopping of the vehicle for every refueling can be prevented. Accordingly, driver's convenience can be improved, and fire accidents can be prevented.

Further, even if the fuel injection port is recognized to be in an open state due to the driver's mistake, damage of the fuel injection port, or circuit defect, it is possible to drive the vehicle in accordance with the driver's driving intention, and thus the blocking of the vehicle driving can be prevented from occurring. In particular, in an emergency situation, such as a situation in which the driver confirms the opening of the fuel injection port, but the vehicle stop is not possible, the problem of the vehicle driving blocking itself can be solved.

Further, the HEV mode is permitted only in case where the vehicle is accelerated by the driver's driving intention through the acceleration pedal operation, and if the vehicle speed exceeds the threshold speed due to the collision with the rear-side vehicle, creep torque, or inclination, the engine start is blocked to prevent accident occurrence.

While the present disclosure has been described with respect to the specific embodiments, it will be apparent to those skilled in the art that various changes and modifications may be made without departing from the spirit and scope of the disclosure as defined in the following claims.

What is claimed is:

1. An apparatus for controlling an engine start during refueling of a hybrid vehicle, the apparatus comprising a controller configured to:
    stop an engine to block the engine start by determining that the hybrid vehicle enters a refueling state in accordance with a fuel injection port open or closed state, a vehicle speed, and brake pedal state (BPS) information,
    start the engine in accordance with a switchover to a hybrid electric vehicle (HEV) mode by determining whether the refueling state is released in accordance with the fuel injection port open or closed state, the vehicle speed, and acceleration pedal state (APS) information,
    upon determining the fuel injection port is closed and the vehicle speed is higher than 0 (zero) based on information with regard to the fuel injection port open or closed state and the vehicle speed input to at least one of the ECU or the HCU, determine release of the refueling state, and
    upon determining the fuel injection port is open and the vehicle speed exceeds a threshold speed by operating an acceleration pedal with an acceleration intention by the driver, determine release of the refueling state and release the stopping of the engine.

2. The apparatus according to claim 1, wherein the controller determines that the hybrid vehicle enters the refueling state when the fuel injection port is open and the vehicle speed is 0 (zero) based the information with regard to the fuel injection port open or closed state and the vehicle speed input to at least one of the ECU or the HCU.

3. The apparatus according to claim 2, wherein the controller stops the engine and blocks the engine start in consideration of a deceleration when the hybrid vehicle decelerates while the fuel injection port is open.

4. The apparatus according to claim 1, wherein, when the acceleration is not caused by the driver's operation of the acceleration pedal in a state in which the vehicle speed exceeds the threshold speed, the controller determines that the refueling state is not released.

5. A method for controlling an engine start during refueling of a hybrid vehicle, the method comprising:
    first determining, by a processor, whether a fuel injection port is open or closed;
    second, upon determining that the fuel injection port is open, determining, by the processor, whether a vehicle speed is 0 (zero) so as to determine whether the hybrid vehicle is in a stopped state upon determining that the fuel injection port is open;
    third, upon determining that the hybrid vehicle is in the stopped state, stopping, by the processor, the engine to block the engine start;
    fourth determining, by the processor, whether the fuel injection port is closed;
    fifth, upon determining that the fuel injection port is not closed, determining, by the processor, whether the vehicle speed exceeds a threshold speed in an electric vehicle (EV) mode driving by operating an acceleration pedal with an acceleration intention by the driver; and
    sixth, upon determining that the vehicle speed exceeds the threshold speed in the EV mode, releasing, by the processor, the stopping of the engine.

6. The method according to claim 5, further comprising a eighth, upon determining that the fuel injection port is closed in the fourth determining, releasing, by processor, the stopping of the engine.

7. The method according to claim 5, further comprising, upon determining that the hybrid vehicle is not in the stopped state in the second determining, releasing the stopping of the engine to permit the engine start.

8. The method according to claim 5, wherein, upon determining that the vehicle speed does not exceed a threshold speed in the electric vehicle (EV) mode in the fifth determining, the fourth determining whether the fuel injection port is closed is performed again.

* * * * *